G. W. ARCHER.
SCREWS FOR PIANO STOOLS.
No. 186,191. Patented Jan. 16, 1877.
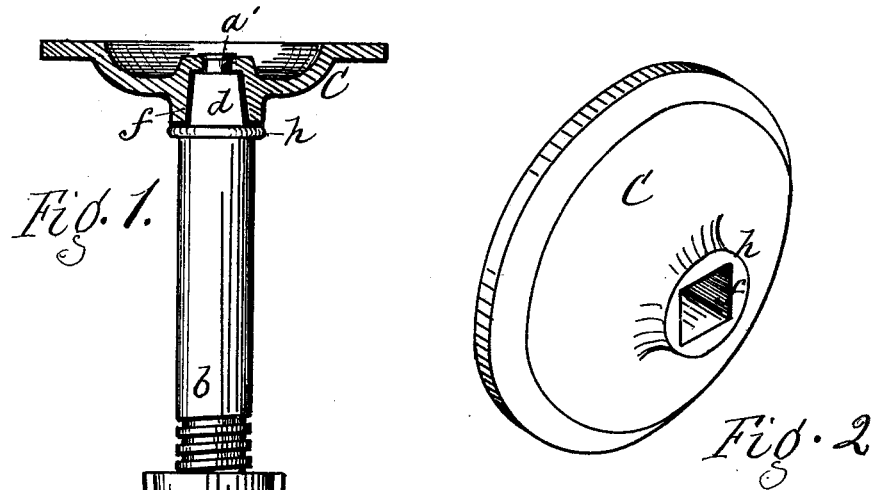
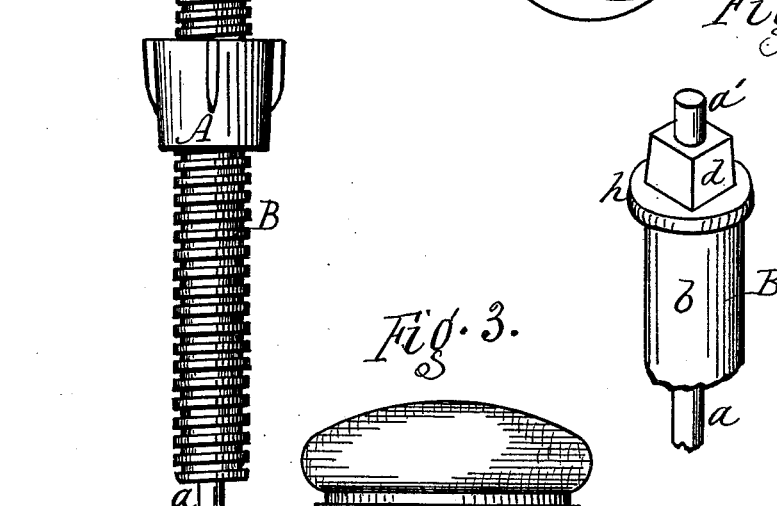
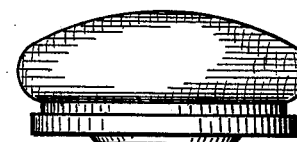
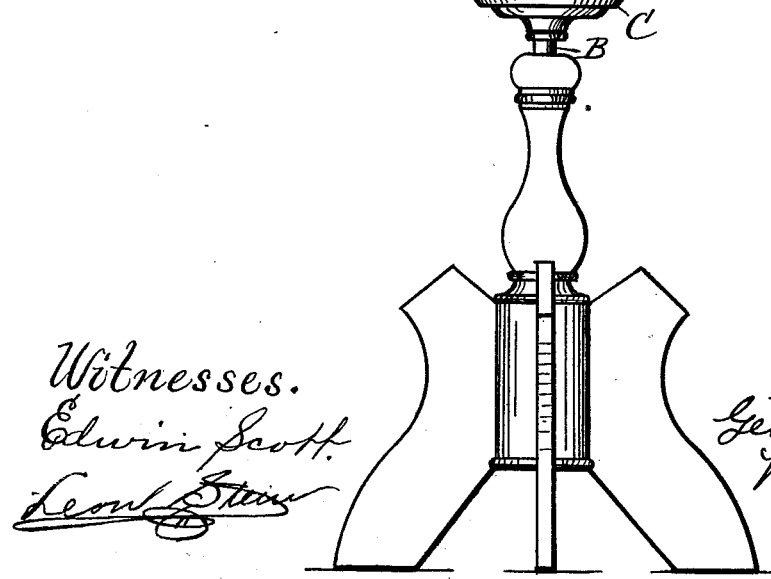
Witnesses.
Edwin Scott
Leon Stein
Inventor.
Geo. W. Archer,
pr R. F. Osgood,
Atty.

UNITED STATES PATENT OFFICE.

GEORGE W. ARCHER, OF ROCHESTER, NEW YORK.

IMPROVEMENT IN SCREWS FOR PIANO-STOOLS.

Specification forming part of Letters Patent No. 186,191, dated January 16, 1877; application filed September 15, 1876.

*To all whom it may concern:*

Be it known that I, GEORGE W. ARCHER, of the city of Rochester, in the county of Monroe and State of New York, have invented a certain new and useful Improvement in Screws for Piano and other Stools; and I do hereby declare that the following is a full, clear, and exact description of the same, reference being had to the accompanying drawings, in which—

Figure 1 is a sectional elevation of the screw, nut, and bearing. Fig. 2 is a perspective view of the screw and bearing separated. Fig. 3 is an elevation of a piano-stool provided with my improvement.

My improvement relates to screws for elevating the seats in piano and other stools. Heretofore, so far as I am aware, such screws have been made from wrought-iron, the threads being cut in the ordinary manner. Such screws are expensive. The difficulty in using cast-iron screws is that the upper end has to be made small to receive the iron bearing which supports the seat, and it is easily broken.

My invention consists of a screw composed of a wrought-iron rod and a cast-iron covering, the rod projecting through at one end and forming the rivet end for attaching the iron bearing; also, of an improved connection of the upper end of the screw with the bearing, as hereinafter more fully described.

A is the nut which rests in the top of the stool-standard. B is the screw which turns up and down therein to elevate or lower the seat. The screw is composed of an interior wrought-iron rod, $a$, and an exterior covering of cast metal, $b$, with the threads cast thereon. The rod $a$ projects beyond the casting at one end, as shown at $a'$. When the bearing C is in place, this end is simply riveted down to secure the parts together. The end of the cast portion is provided with a square or slightly conical tenon, $d$, which fits in a corresponding socket, $f$, of the bearing, and the screw is provided with a shoulder, $h$, upon which the bearing rests.

By casting the rod $a$ into the screw the strength of the screw is greatly increased, enabling it to be made of smaller size without danger of breakage. A more special advantage, however, consists in the projection of the end of the interior rod beyond the screw, so as to form the rivet end for securing the bearing C. A solid cast-iron screw could not be used in this manner, for the reason that cast-iron is too brittle to be riveted down, and has not sufficient strength.

Another advantage consists in forming the square tenon $d$ on the end of the cast portion of the screw, which fits within the socket of the bearing and prevents the latter from turning; also, forming the shoulder $h$, which serves to level the parts, and holds the parts in a horizontal position, enabling the rivet end $a'$ to be projected through the bearing, and be headed down, as before described.

Having thus described my invention, I do not claim, broadly, a wrought-iron center, having a cast-iron covering, as I am aware that the same is not new; but

What I claim herein as new is—

1. The screw B, consisting of the interior wrought-iron rod $a$ and exterior cast-iron covering $b$, the wrought-iron rod projecting at one end beyond the screw, and forming the rivet end to secure the bearing C, as shown and described, and for the purpose specified.

2. In combination with the screw B and bearing C, the square tenon $d$ of the screw, resting in the socket $f$ of the bearing, and the square shoulder $h$, receiving the bearing, as and for the purpose specified.

In witness whereof I have hereunto signed my name in the presence of two subscribing witnesses.

GEO. W. ARCHER.

Witnesses:
R. F. OSGOOD,
CHAUNCEY NASH.